US010102007B2

(12) United States Patent
Gschwind et al.

(10) Patent No.: US 10,102,007 B2
(45) Date of Patent: *Oct. 16, 2018

(54) SIMULTANEOUSLY CAPTURING STATUS INFORMATION FOR MULTIPLE OPERATING MODES

(71) Applicant: INTERNATIONAL BUSINESS MACHINES CORPORATION, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 45 days.

This patent is subject to a terminal disclaimer.

(21) Appl. No.: 15/194,877

(22) Filed: Jun. 28, 2016

(65) Prior Publication Data

US 2017/0123816 A1  May 4, 2017

Related U.S. Application Data

(63) Continuation of application No. 14/927,671, filed on Oct. 30, 2015, now Pat. No. 9,727,353.

(51) Int. Cl.
*G06F 9/00* (2006.01)
*G06F 9/4401* (2018.01)
(Continued)

(52) U.S. Cl.
CPC ............... *G06F 9/441* (2013.01); *G06F 9/30* (2013.01); *G06F 9/4411* (2013.01);
(Continued)

(58) Field of Classification Search
CPC ............ G06F 9/44505; G06F 11/3409; G06F 11/3024
See application file for complete search history.

(56) References Cited

U.S. PATENT DOCUMENTS 4,794,521 A    12/1988  Ziegler et al.
5,386,563 A *   1/1995  Thomas ............... G06F 9/462
                                                      710/260
(Continued)

OTHER PUBLICATIONS

Gschwind, Michael K. et al., "Simultaneously Capturing Status Information for Multiple Operating Modes," U.S. Appl. No. 15/613,645, filed Jun. 5, 2017, pp. 1-44.
(Continued)

*Primary Examiner* — Vincent Tran
(74) *Attorney, Agent, or Firm* — Steven Chiu, Esq.; Blanche E. Schiller, Esq.; Heslin Rothenberg Farley & Mesiti P.C.

(57) ABSTRACT

Status indicators are provided. An operation is performed in a current operating mode of the processor, in which the current operating mode is dynamically selectable from a plurality of supported operating modes. A first set of status indicators is set, based on performing the operation in the current operating mode. A second set of status indicators is set, based on performing the operation in the current operating mode, but the setting is to reflect at least one status condition for another operating mode supported by the processor. At least one of the first set of status indicators or the second set of status indicators is used in further processing.

20 Claims, 10 Drawing Sheets

(51) Int. Cl.
*G06F 11/34* (2006.01)
*G06F 11/30* (2006.01)
*G06F 9/30* (2018.01)
*G06F 9/455* (2018.01)

(52) U.S. Cl.
CPC ...... *G06F 11/3024* (2013.01); *G06F 11/3409* (2013.01); *G06F 9/455* (2013.01)

(56) References Cited

U.S. PATENT DOCUMENTS

| | | | |
|---|---|---|---|
| 6,035,316 | A | 3/2000 | Peleg et al. |
| 6,237,078 | B1 | 5/2001 | Gray |
| 6,301,597 | B1 | 10/2001 | Petro et al. |
| 6,807,616 | B1 | 10/2004 | McGrath |
| 8,738,893 | B2 | 5/2014 | Gopal |
| 9,292,283 | B2 | 3/2016 | Ozturk |
| 9,727,353 | B2 * | 8/2017 | Gschwind ............ G06F 9/44505 |
| 2002/0179719 | A1 | 12/2002 | Goff |
| 2004/0225869 | A1 * | 11/2004 | Pagni .................. G06F 9/30098 712/227 |
| 2005/0188000 | A1 | 8/2005 | Takegama |
| 2008/0222388 | A1 | 9/2008 | Mihocka |
| 2009/0030668 | A1 | 1/2009 | Mihocka |
| 2012/0079479 | A1 | 3/2012 | Hakewill |
| 2015/0143084 | A1 * | 5/2015 | Loktyukhin ........ G06F 9/30018 712/207 |
| 2017/0123826 | A1 | 5/2017 | Gschwind et al. |

OTHER PUBLICATIONS

List of IBM Patents or Patent Applications Treated as Related, dated Jun. 7, 2017, pp. 1-2.

Mell, Peter and Tim Grance, "The NIST Definition of Cloud Computing," National Institute of Standards and Technology, Information Technology Laboratory, Special Publication 800-145, Sep. 2011, pp. 1-7.

IBM, "Power ISA™ V 2.07B," Apr. 9, 2015, pp. 1-1527.

Jiang, G., "Machine-Level Representation of Programs," csapp.cs.cmu.edu/2e/ch3-preview.pdf, Mar. 15, 2012, pp. 145-161.

Gschwind, Michael K. et al., "Simultaneously Capturing Status Information for Multiple Operating Modes," U.S. Appl. No. 14/927,671, filed Oct. 30, 2015, pp. 1-44.

List of IBM Patents or Patent Applications Treated as Related, dated Jul. 15, 2016, pp. 1-2.

* cited by examiner

SIMULTANEOUSLY CAPTURING STATUS INFORMATION FOR MULTIPLE OPERATING MODES

This application is a continuation of co-pending U.S. Ser. No. 14/927,671, entitled "SIMULTANEOUSLY CAPTURING STATUS INFORMATION FOR MULTIPLE OPERATING MODES," filed Oct. 30, 2015, which is hereby incorporated herein by reference in its entirety.

BACKGROUND

One or more aspects relate, in general, to processing within a computing environment, and in particular, to processing associated with multiple modes of operation within the computing environment.

Certain computer languages, such as JavaScript and Python, which are used to provide web services, offer dynamic data typing. With dynamic data typing, variables do not necessarily need to be defined prior to runtime. However, as a side effect of this capability, a variety of data type sizes for a given data type, such as integer, are typically supported, as well as automatic escalation. With automatic escalation, when the result of an integer operation of 32 bits does not fit in a 32-bit register, the type of the resulting computation is dynamically changed to 64 bits. In turn, when a computation with 64-bit inputs does not fit into a 64-bit result, it may escalate into a 128-bit or variable-width integer type, and so forth.

Although automatic escalation may be used, status information relating to the computation may be limited to the original data size.

SUMMARY

Shortcomings of the prior art are overcome and additional advantages are provided through the provision of a computer-implemented method of providing status indicators. The method includes performing, by a processor, an operation in a current operating mode of the processor, the current operating mode being dynamically selectable from a plurality of supported operating modes; setting a first set of status indicators, based on performing the operation in the current operating mode, the first set of status indicators to include at least one status indicator; setting a second set of status indicators, based on performing the operation in the current operating mode, the second set of status indicators to include at least one status indicator and set to reflect at least one status condition for another operating mode supported by the processor; and using at least one of the first set of status indicators and the second set of status indicators in further processing.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to concurrently (i.e., based on execution of one instruction, such as one arithmetic instruction) determine status conditions for a plurality of modes of operation. These status conditions include, for instance, an overflow status condition to record the occurrence of an overflow, and a carry status condition to record the occurrence of a carry out of the most-significant bit of a result.

For example, a plurality of overflow status indicators and carry status indicators are provided for a plurality of modes of operation. In particular, a computing environment may support a plurality of operating modes, such as a 32-bit mode, a 64-bit mode, a 128-bit mode, etc., and in accordance with an aspect of the present invention, there are an overflow status indicator and a carry status indicator for each of the plurality of modes, such that status conditions are concurrently provided for multiple operating modes.

As a particular example, an ability is provided to capture a current operating mode determined set of status conditions and another set of status conditions that do not correspond to the current operating mode based on execution of an instruction in the current operating mode.

One embodiment of a computing environment to incorporate and/or use one or more aspects of the present invention is described with reference to FIG. 1. In one example, computing environment 100 includes at least one computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

Figure 1:
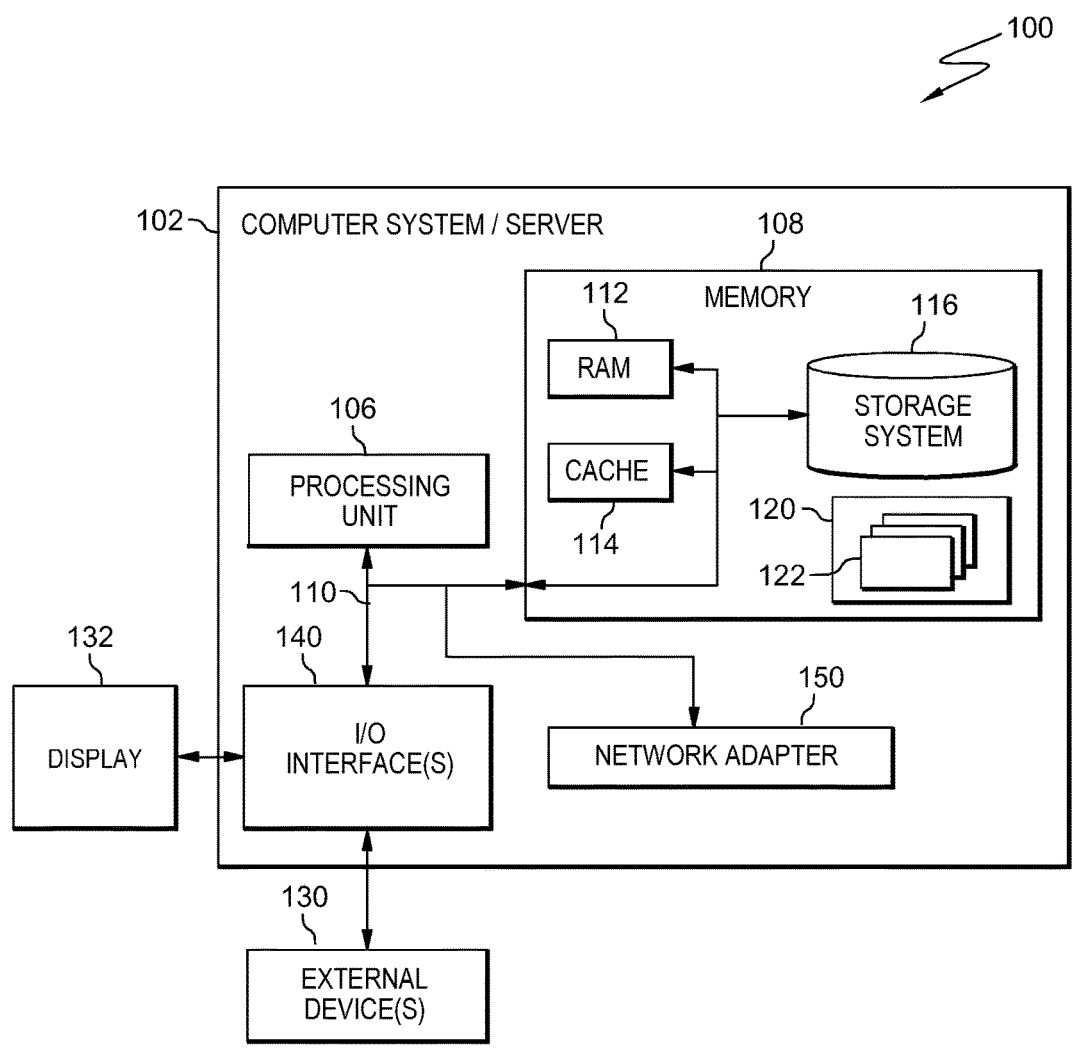
FIG. 1 depicts one example of a computer system/server of a computing environment to incorporate and/or use one or more aspects of the present invention.

As shown in FIG. 1, computer system/server 102 is shown in the form of a general-purpose computing device. The components of computer system/server 102 may include, but are not limited to, one or more processors or processing units 106, a system memory 108, and a bus 110 that couples various system components including system memory 108 to processor 106.

In one embodiment, processor 106 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In other examples, processor 106 may be based on other architectures, such as the z/Architecture offered by International Business Machines Corporation, or other architectures offered by International Business Machines Corporation or other companies.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 108 can include computer system readable media in the form of volatile memory, such as random access memory (RAM) 112 and/or cache memory 114. Computer system/server 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. As will be further depicted and described below, memory 108 may include at least one program product having a set (e.g., at least one) of program modules that are configured to carry out the functions of embodiments of the invention.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data or some combination thereof, may include an implementation of a networking environment. Program modules 122 generally carry out the functions and/or methodologies of embodiments of the invention as described herein.

Computer system/server 102 may also communicate with one or more external devices 130 such as a keyboard, a pointing device, a display 132, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 140. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 110. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2A:
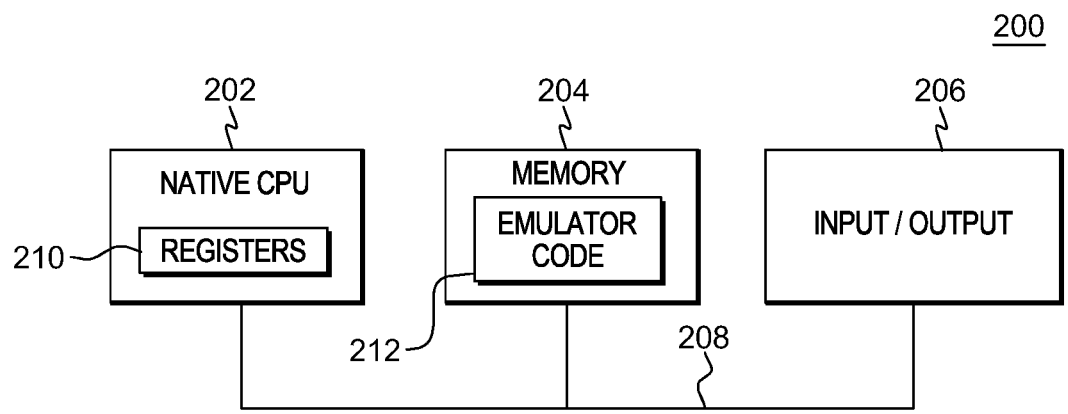
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
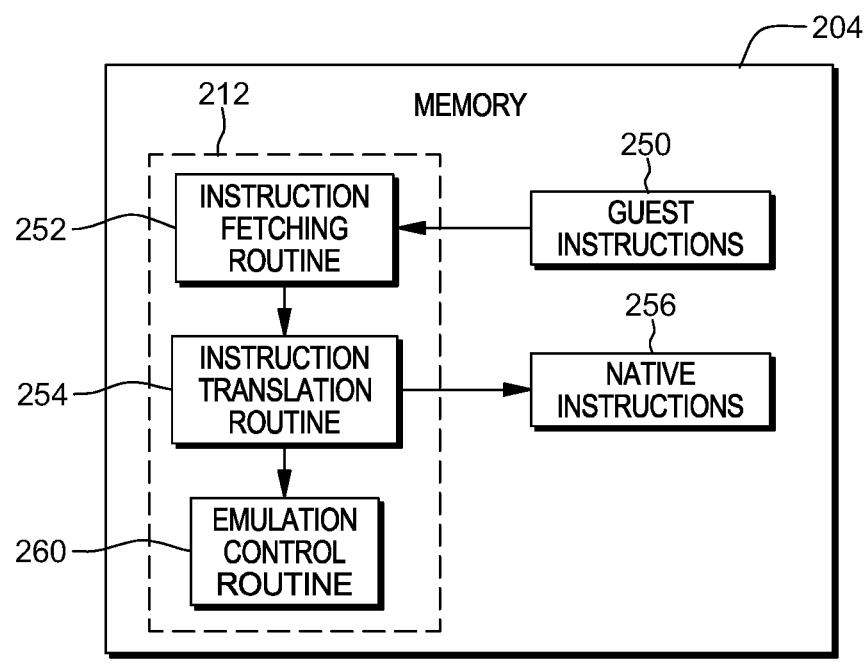
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture), is fetched from memory, translated and represented as a sequence of native instructions 256 of another architecture (e.g., the z/Architecture, Power architecture, Intel architecture, etc.). These native instructions are then executed.

As described herein, in one embodiment, a processor may support a plurality of modes of operation, including, for instance, a 32-bit mode, a 64-bit mode, a 128-bit mode, etc. In each mode, instructions operate on data of that particular width. For instance, in 32-bit mode, instructions operate on data of a 32-bit width, and in 64-bit mode, instructions operate on data of a 64-bit width, etc. Although a processor is set to execute in one mode at any particular point in time, these instructions (referred to as a bimodal or multi-modal instructions) may return results that are usable in multiple data widths by examining the low order N bits of interest in the result for the desired data width. Further, these instructions may set certain status indicators, but have been restricted to setting the status based on the current operating mode.

For instance, assume a processor supports a 32-bit operating mode and a 64-bit operating mode, and further assume the status indicators include an overflow status indicator (OV) and a carry status indicator (CA), then when the processor is in 32-bit mode, the overflow status indicator is set to indicate if a 32-bit overflow occurred, and the carry status indicator is set to indicate if a 32-bit carry occurred. Otherwise, when the processor is in 64-bit mode, the overflow status indicator is set to indicate if a 64-bit overflow occurred, and the carry status indicator is set to indicate if a 64-bit carry occurred. That is, when the processor is set in one mode, the status for another mode is not provided unless a costly context switch is performed to place the processor in the other mode.

Therefore, when the processor is in 32-bit mode, while operations are capable of producing correct 64-bit results for 64-bit data types using these bimodal instructions, status (e.g., CA and/or OV) is set based on 32-bit results. That is, 64-bit status for these instructions has not been available in 32-bit mode. Further, when the processor is in 64-bit mode, while operations are capable of producing correct 32-bit results for 32-bit data types using these bimodal instructions, status (e.g., CA and/or OV) is set based on 64-bit results. 32-bit status has not been available in 64-bit mode.

Switching between 32-bit mode and 64-bit (or wider) mode is an extremely expensive state change involving an operating system call, such that 32-bit status is effectively not available when the processor is in 64-bit (or wider) mode, and vice-versa.

Thus, in accordance with an aspect of the present invention, a concurrent status setting capability provides an effective way of determining whether a data type fits in 32 bits while operating in 64-bit or wider mode, or in 64 bits or wider when operating in 32-bit mode, as examples. This capability includes, for instance, the provision of a plurality of overflow status indicators and a plurality of carry status indicators. Although overflow and carry status indicators are described herein, other status indicators in addition to and/or in lieu of the overflow and carry indicators may be provided.

Figure 3:
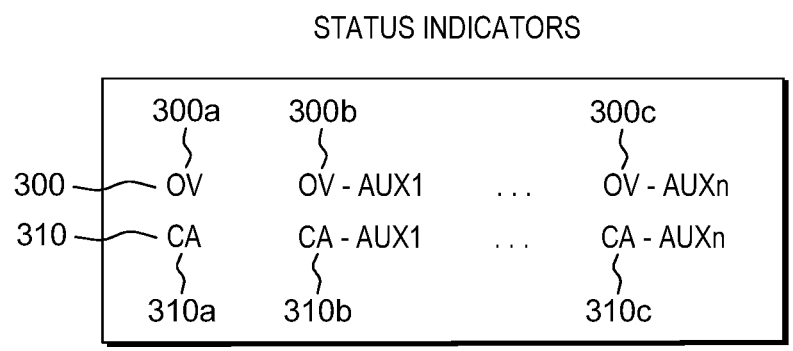
FIG. 3 depicts one example of status indicators used in accordance with one or more aspects of the present invention.

For example, as shown in FIG. 3, there are a plurality of overflow status indicators 300, including, for instance, an overflow indicator (OV) 300a used to indicate an overflow condition for a current operating mode (e.g., 64-bit) and an overflow indicator (OV-AUX1) 300b used to indicate an overflow condition for another operating mode (i.e., a non-current operating mode, e.g., 32-bit). In a further embodiment, the processor may support other operating modes, and then, for each additional operating mode, there may be an additional overflow indicator 300c for each additionally supported operating mode.

Similarly, in this example, there are a plurality of carry status indicators 310, including, for instance, a carry indicator (CA) 310a used to indicate a carry condition for a current operating mode (e.g., 64-bit) and a carry indicator (CA-AUX1) 310b used to indicate a carry condition for another supported operating mode (i.e., the non-current operating mode, e.g., 32-bit). In a further embodiment, the processor may support other operating modes, and then, for each additional operating mode, there may be an additional carry indicator 310c for each additionally supported operating mode.

Thus, by using multiple indicators, status conditions may be simultaneously captured for multiple operating modes and the values of these indicators may be used in subsequent operations. For instance, based on execution of an arithmetic instruction (e.g., add, subtract, multiply, divide, etc.), multiple overflow status indicators and/or carry status indicators may be set (e.g., to 1, if the condition occurred; or to 0, if the condition did not occur).

In one particular example, the indicators are included in a register, such as an extended fixed-point exception register (XER). The indicators are included in certain locations (e.g., bits) of the XER register, and in this particular example, a first location (e.g., bit 33) includes an overflow status indicator for the current operating mode (e.g., 64-bit), a second location (e.g., bit 35) includes an overflow status indicator for another operating mode (e.g., 32-bit), a third location (e.g., bit 34) includes a carry status indicator for the current operating mode (e.g., 64-bit), and a fifth location (e.g., bit 36) includes a carry status indicator for the other operating mode (e.g., 32-bit). Although in this example, only two sets of indicators are provided, in other embodiments, additional sets may be provided. Further, although specific bits are indicated, other bits within the register may represent status indicators. Further, in other embodiments, the locations may be other than bit-size. Yet further, a register other than XER may be used, or an entity other than a register may be used. Yet further, although in the examples herein, 64-bit is the current operating mode and 32-bit is the non-current operating mode, this is only one example. In other examples, the current operating mode may be 32-bit or another operating mode, and/or the non-current operating mode may be 64-bit or another mode. Many possibilities exist.

Based on executing an arithmetic instruction, a determination is made as to whether an overflow condition occurred in the current operating mode or in another mode supported by the processor. Thus, if an overflow condition did not occur in the current operating mode, then the corresponding overflow status indicator (e.g., OV) is set to, e.g., zero (or remains at zero; as used herein, set to a particular value includes setting the indicator to a particular value and/or not changing the value if it was initialized or previously set to that value); otherwise, if an overflow condition did occur in the current operating mode, then the corresponding overflow status indicator (e.g., OV) is set to, e.g., one. Likewise, if an overflow condition occurred for the other supported operating mode, then the corresponding overflow indicator (e.g., OV-AUX1) is set to, e.g., one. If there was no overflow condition, then the corresponding overflow indicator (e.g., OV-AUX1) is set to, e.g., zero.

Similarly, based on executing the arithmetic instruction, a determination is made as to whether a carry condition occurred in the current operating mode or in another supported mode. If a carry did not occur in either mode, then each corresponding carry indicator is set to, e.g., zero; otherwise, if a carry occurred in one or more modes, then the corresponding carry indicator is set, e.g., to one.

In accordance with a further aspect of the present invention, use of these indicators is facilitated by an instruction provided to copy the status indicators from the XER to a condition register (CR), which may be tested by, e.g., branch instructions and/or other instructions.

Figure 4:
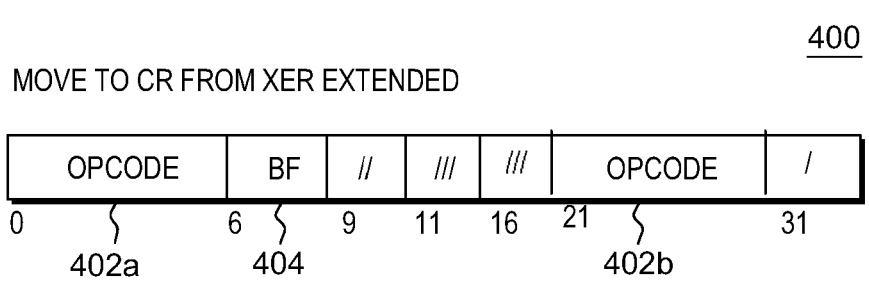
FIG. 4 depicts one example of a Move to Control Register From XER Extended instruction, in accordance with an aspect of the present invention.

One example of an instruction to copy the status indicators is described with reference to FIG. 4. An instruction 400, referred to as a Move to CR from XER Extended instruction, includes, for instance, an opcode 402a, 402b to indicate a move to condition register from XER extended operation, and a field (BF) 404 indicating a location to which the value of the status indicators are to be copied.

In operation of the move instruction, the contents of the defined status indicators are copied to a location within the condition register specified by field BF. In one particular example, there are four status indicators (e.g., OV, OV-AUX1, CA and CA-AUX1), and the contents of those status indicators are copied to bits 32 to 35 of the condition register, as specified by BF. In further embodiments, there may be additional status indicators that may be copied and/or the indicators may be copied to other locations within the condition register, to other registers and/or to other locations altogether.

Figure 5:
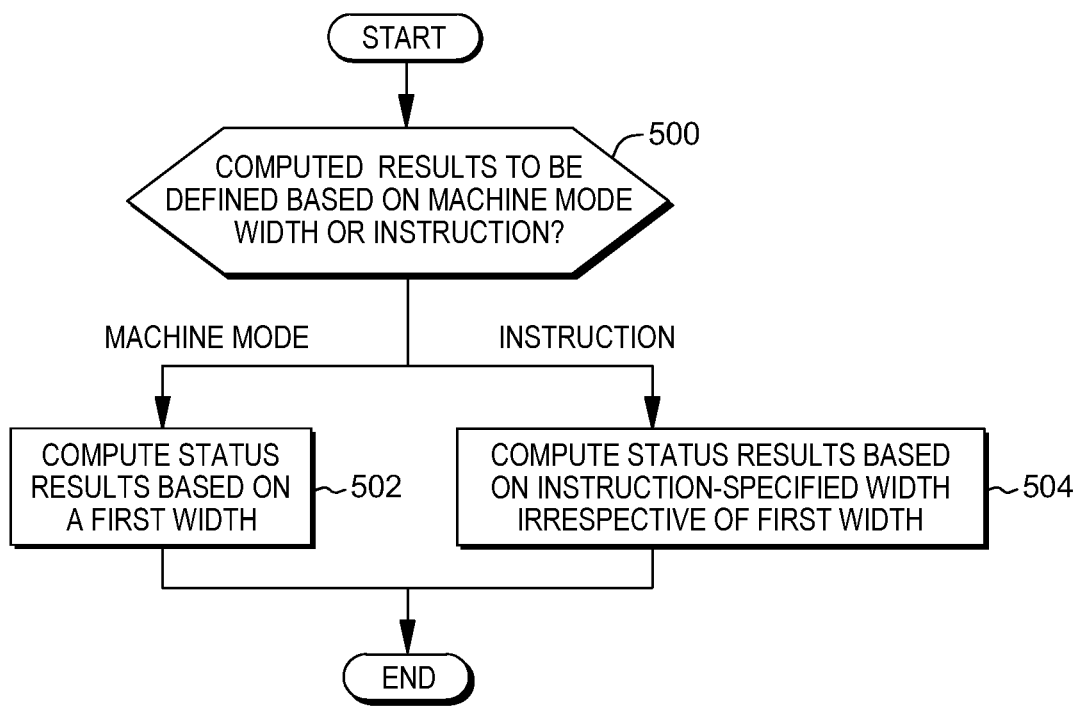
FIG. 5 depicts one embodiment of logic to compute status results based on one data width, in accordance with an aspect of the present invention.
Figure 6:
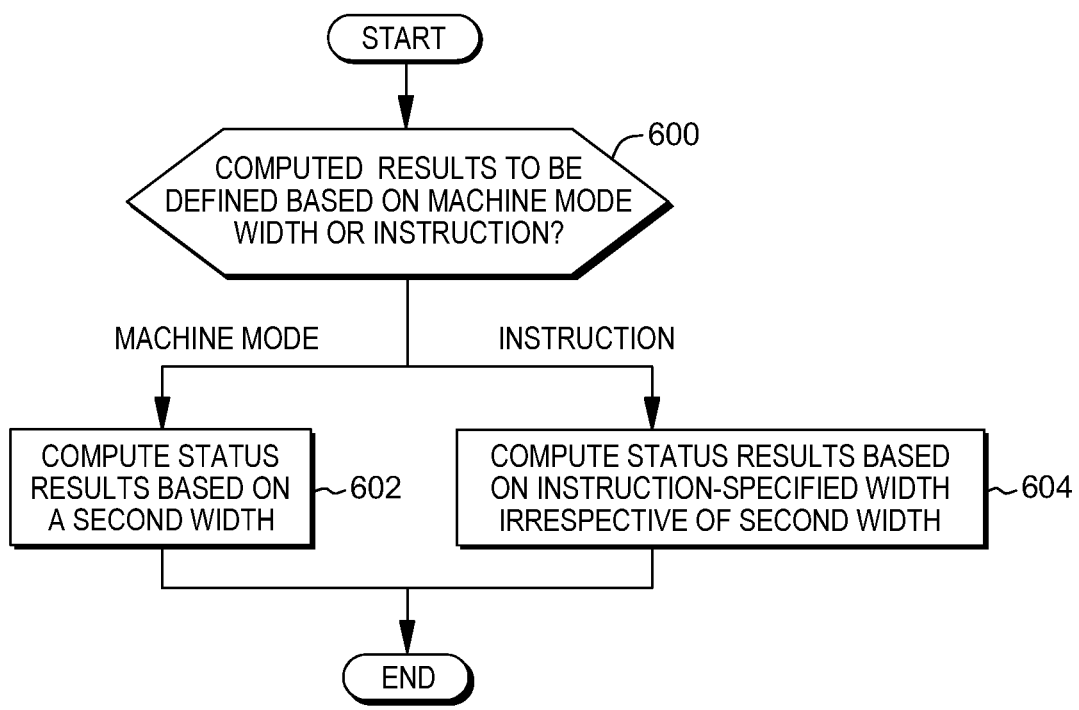
FIG. 6 depicts one embodiment of logic to compute status results based on another data width, in accordance with an aspect of the present invention.
Figure 7:
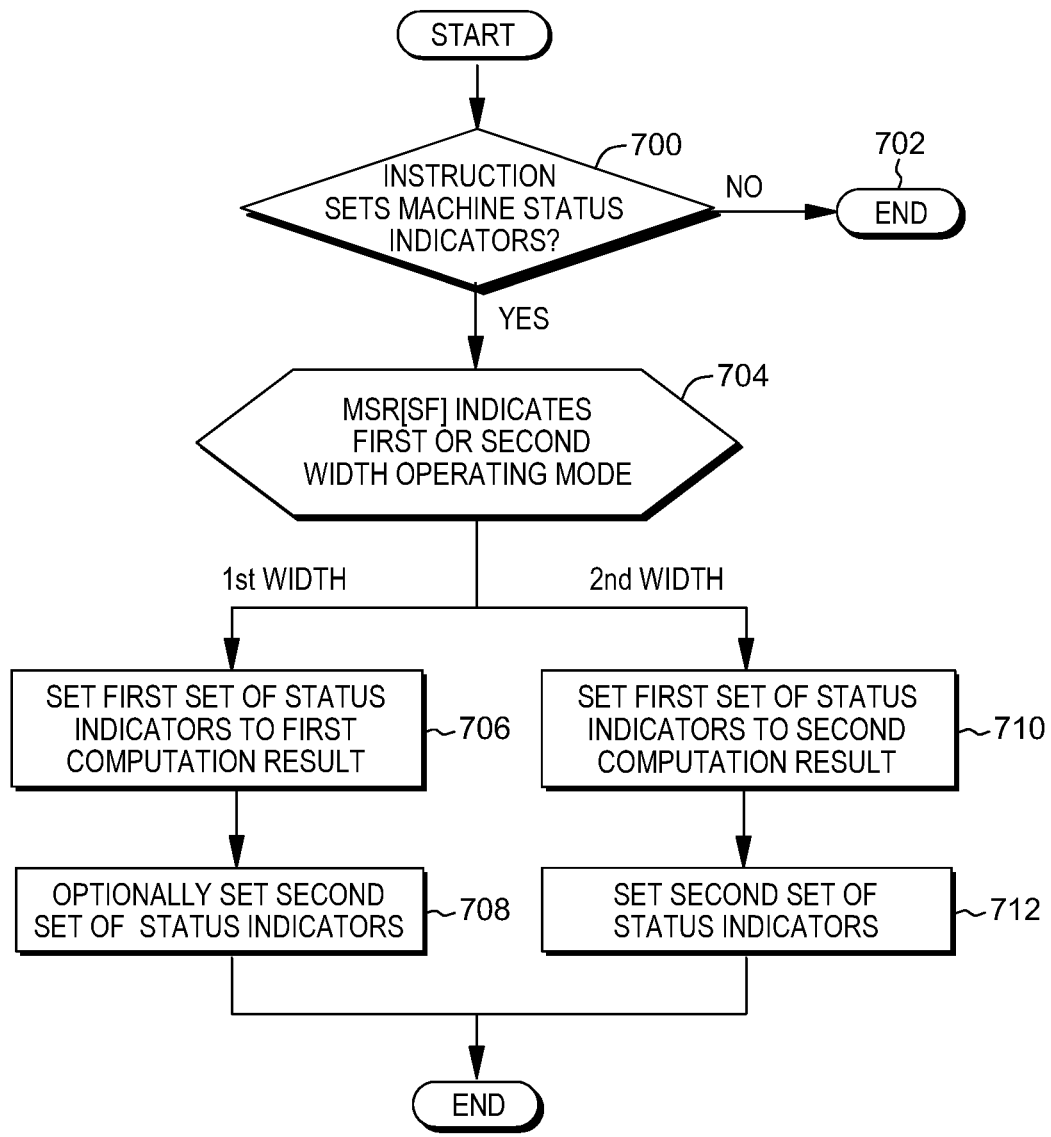
FIG. 7 depicts one embodiment of logic to set a plurality of status indicators for a plurality of operating modes, in accordance with an aspect of the present invention.

One embodiment of logic used to concurrently set the status indicators for a plurality of operating modes, based on execution of an operation in the current operating mode, is described with reference to FIGS. 5-7. In particular, FIG. 5 depicts logic to compute status results based on a first width (e.g., 32-bit); FIG. 6 depicts logic to compute status results based on a second width (e.g., 64-bit); and FIG. 7 depicts logic to set the status indicators based on the computed status results. The logic of FIGS. 5-7 is performed by one or more processors.

Referring to FIG. 5, initially, based on execution of an instruction that sets status indicators, such as an arithmetic instruction (e.g., add, subtract, multiply, divide, etc.) the processor determines whether computed status results are to be defined based on the operating mode of the processor (also referred to as the machine mode) or based on the defined instruction width, INQUIRY 500. That is, in one embodiment, the processor may be operating in one mode, but may execute instructions explicitly defined in another operating mode. Thus, the inquiry tests whether the results are to be computed based on the machine mode or the instruction width.

If the results are to be computed based on the machine mode, then status results, e.g., corresponding to overflow and carry conditions, are set based on a first width, e.g., 32-bit, STEP 502. For instance, the instruction (e.g., add, subtract, multiply, divide, etc.) performs an operation (e.g., add, subtract, multiply, divide, etc., depending on the instruction) in the current operating mode of the processor (e.g, 64 bit). This operation produces a result, which is placed in a register. The register is the size of the maximum supported operating mode of the processor. Thus, for the given width, e.g., the first width, those number of bits (e.g., 32, in this example) of the register are checked to determine if an overflow and/or a carry would have occurred if the operating mode was the first width. If an overflow would have occurred in the first width, then an overflow computation result for the first width is set to 1; otherwise, it is set to 0. Similarly, if the operation would have caused a carry in the first width, then a carry computation result for the first width is set to 1; otherwise, it is set to 0.

Returning to INQUIRY 500, if the results are to be defined based on the instruction width, then the status results are set based on the defined width of the instruction irrespective of the machine mode, STEP 504. For instance, if the instruction is in 32-bit mode, and performance of an operation results in an overflow, then an overflow computation result for the instruction width is set to 1; otherwise, it is set to 0. Similarly, if the operation results in a carry, then a carry computation result is set to 1; otherwise, it is set to 0. (In a further embodiment, the testing for instruction mode and/or the logic for instruction mode is not provided and/or performed.)

Now referring to FIG. 6, based on the same execution of the instruction as in FIG. 5 (i.e., the instruction is not re-executed), the processor determines whether the status results are to be defined based on the operating mode of the processor or based on the defined instruction width, INQUIRY 600. (In one embodiment, this test is not repeated, but the results of INQUIRY 500 are used.) If the results are to be defined based on the machine mode, then status results, e.g., corresponding to overflow and carry conditions, are set based on a second width (e.g., 64-bit), STEP 602. In this case, the number of bits in the result register for this given width are checked to determine if an overflow and/or a carry would have occurred if the operating mode was the second width (which, in this example, it is the current operating mode). If an overflow would have occurred in the second width, then an overflow computation result for the second width is set to 1; otherwise, it is set to 0. Similarly, if the operation would have resulted in a carry, then a carry computation result for the second width is set to 1; otherwise, it is set to 0.

Returning to INQUIRY 600, if the results are to be defined based on the instruction width, then the status results are set based on the defined width of the instruction irrespective of the machine mode, STEP 604. For instance, if the instruction is in 32-bit mode, and performance of an operation results in an overflow, then an overflow computation result for the instruction width is set to 1; otherwise, it is set to 0. Similarly, if the operation would have resulted in a carry, then a carry computation result for the instruction width is set to 1; otherwise, it is set to 0.

The results computed above may then be used to concurrently set the plurality of sets of status indicators based on execution of a single instruction (i.e., the instruction does not have to be re-executed to set the plurality of sets of status indicators). For instance, with reference to FIG. 7, the processor determines whether it is executing an instruction (such as an arithmetic instruction) that may set status indicators, such as overflow and/or carry indicators, INQUIRY 700. If not, then this processing is complete, STEP 702. Otherwise, if the processor is executing an instruction that may result in setting status indicators, then a further determination is made as to the operating mode of the processor, INQUIRY 704. For instance, an indicator (e.g., SF) in a machine state register (MSR) is checked to determine the current operating mode of the processor. In this particular example, two operating modes are supported, and therefore, if SF is equal to 0, then the current operating mode of the processor is e.g., a 32-bit mode, and if it is equal to 1, then the current operating mode of the processor is e.g., 64-bit mode. If other modes are to be supported, then additional bits of the SF field and/or bits of other fields of the machine state register may be checked.

Should the first width (e.g., 32-bit) be indicated as the current operating mode, then a first set of indicators (e.g., OV and CA) is set to the first computational result (from STEP 502), STEP 706. Further, in accordance with an aspect of the present invention, one or more additional sets of status indicators may be set, STEP 708. In this example, one set of status indicators (e.g., OV-AUX1 and CA-AUX1) is set equal to the second computational result (e.g., STEP 602). However, since 32-bit is the smallest selectable supported width, the second set of status indicators may not include useful data, so in a further example, the second set of indicators may be set to any value, including the first computational result or a computational result for another preselected operating mode. Many variations are possible, including not setting the second set of status indicators in this situation.

Returning to INQUIRY 704, if the second width is specified as the current operating mode (e.g., 64-bit mode), then the first set of indicators (e.g., OV and CA) is set based on the second computation results (e.g., STEP 602), STEP 710. Further, a second set of indicators (e.g., OV-AUX1 and CA-AUX1) may be set based on the first computation results (e.g., STEP 502), STEP 712.

Figure 8:
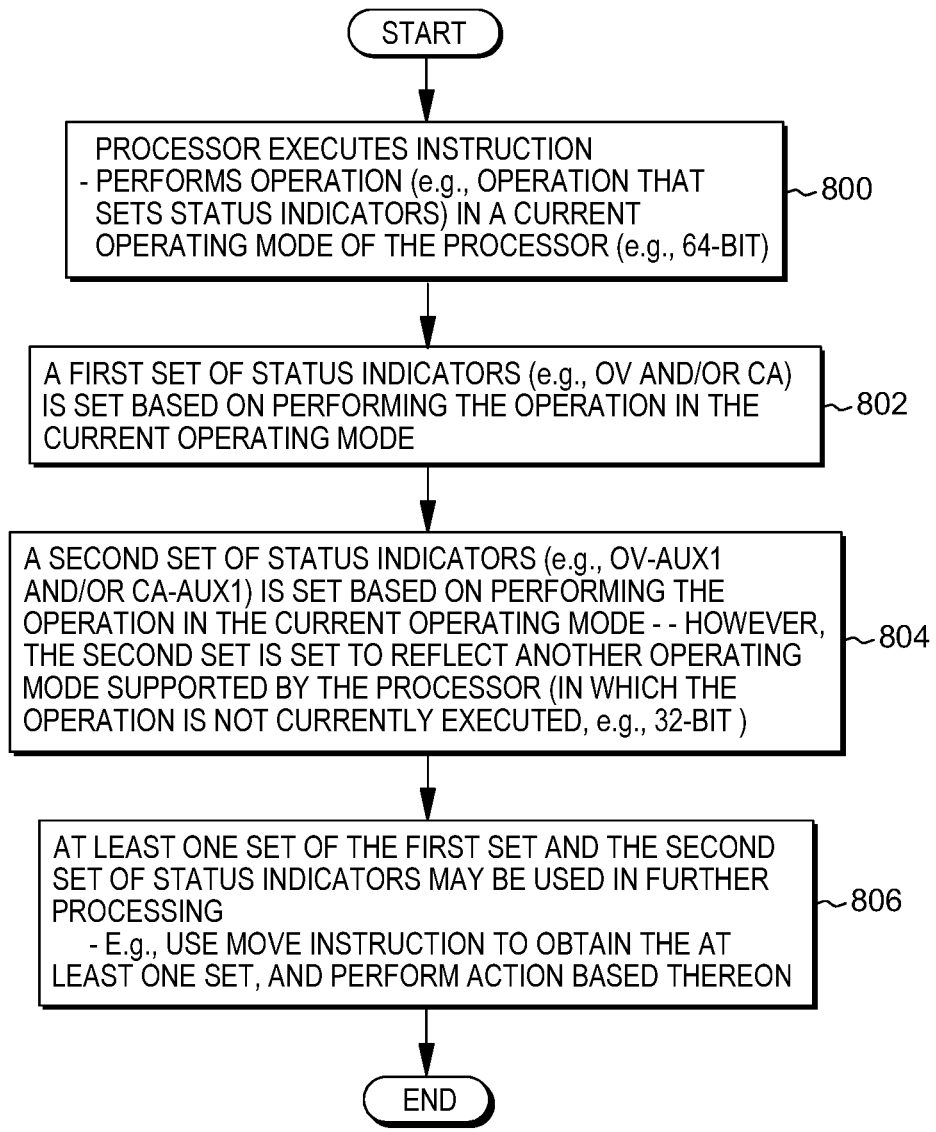
FIG. 8 depicts further details of an embodiment to set a plurality of status indicators for a plurality of operating modes, in accordance with an aspect of the present invention.

Additional details relating to concurrently setting a plurality of sets of status indicators based on execution of a single instruction in the current operating mode are described with reference to FIG. 8. Initially, a processor executes an instruction that performs an operation in a current operating mode of the processor (e.g., 64 bit), STEP 800. Based on performing the operation in the current operating mode, a first set of status indicators (e.g., OV and/or CA) is set, STEP 802. Additionally, based on performing that operation in the current operating mode, a second set of status indicators (e.g., OV-AUX1 and/or CA-AUX1) is set. However, the second set of status indicators is set to reflect another operating mode supported by the processor in which the operation is not currently executed (e.g., 32-bit), STEP 804. Thereafter, at least one set of the first set and the second set of status indicators may be used in further processing, STEP 806. For instance, a move instruction may be used to obtain the at least one set of status indicators, and an action may be based thereon, such as a branch or other type of action.

Figure 9:
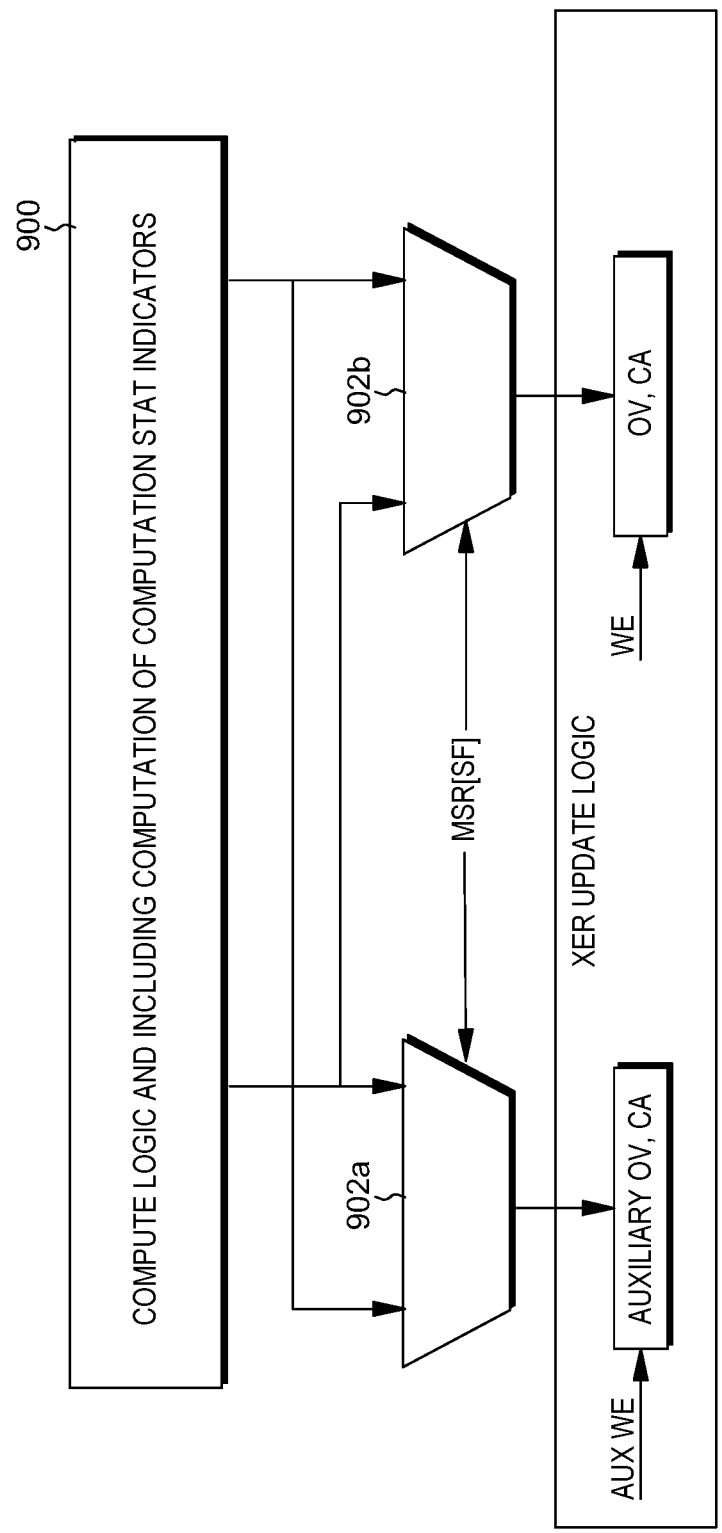
FIG. 9 depicts one example of processor components used to provide the plurality of status indicators, in accordance with an aspect of the present invention.

Further details relating to processor components that may be used to perform the logic to concurrently provide status indicators for multiple operating modes are described with reference to FIG. 9. The processor includes, for instance, compute logic 900 coupled to a plurality of multiplexors 902a, 902b, which are controlled by MSR[SF]. The output of multiplexor 902a provides OV-AUX1 and CA-AUX1 for the non-current operating mode (or another selected operating mode), and the output of multiplexor 902b provides OV, CA for the current operating mode. In a further embodiment, the logic may suppress the writing to OV-AUX1 and/or CA-AUX1 in certain circumstances (e.g., the current operating mode is the smallest supported mode (e.g., 32-bit)).

Described above is a capability for simultaneously capturing status conditions for multiple operating modes of a processor, including a current operating mode and a non-current operating mode, based on execution of a single instruction in the current operating mode. In accordance with an aspect of the present invention, computation instructions, which have a carry or an overflow condition, set multiple sets of carry and overflow indicators in a resource, such as a control register, a special purpose register or a program status word, as examples. In one particular example, two sets of overflow and carry indicators are set. With such a definition, one set of carry and overflow indicators corresponds to a current execution mode (either of the instruction, or of a modally defined execution, e.g., 64*b* or 32*b*), and a second set of carry and overflow indicators are provided for the other operating mode. In one aspect, there is provided a way to manipulate a testing of the 32-bit mode overflow and carry (and, optionally, other flags) when the processor is in 64-bit (or wider) operating mode by providing a set of condition encodings referencing the alternate mode conditions.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 1. Computer system/server 102 of FIG. 1 may be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Figure 10:
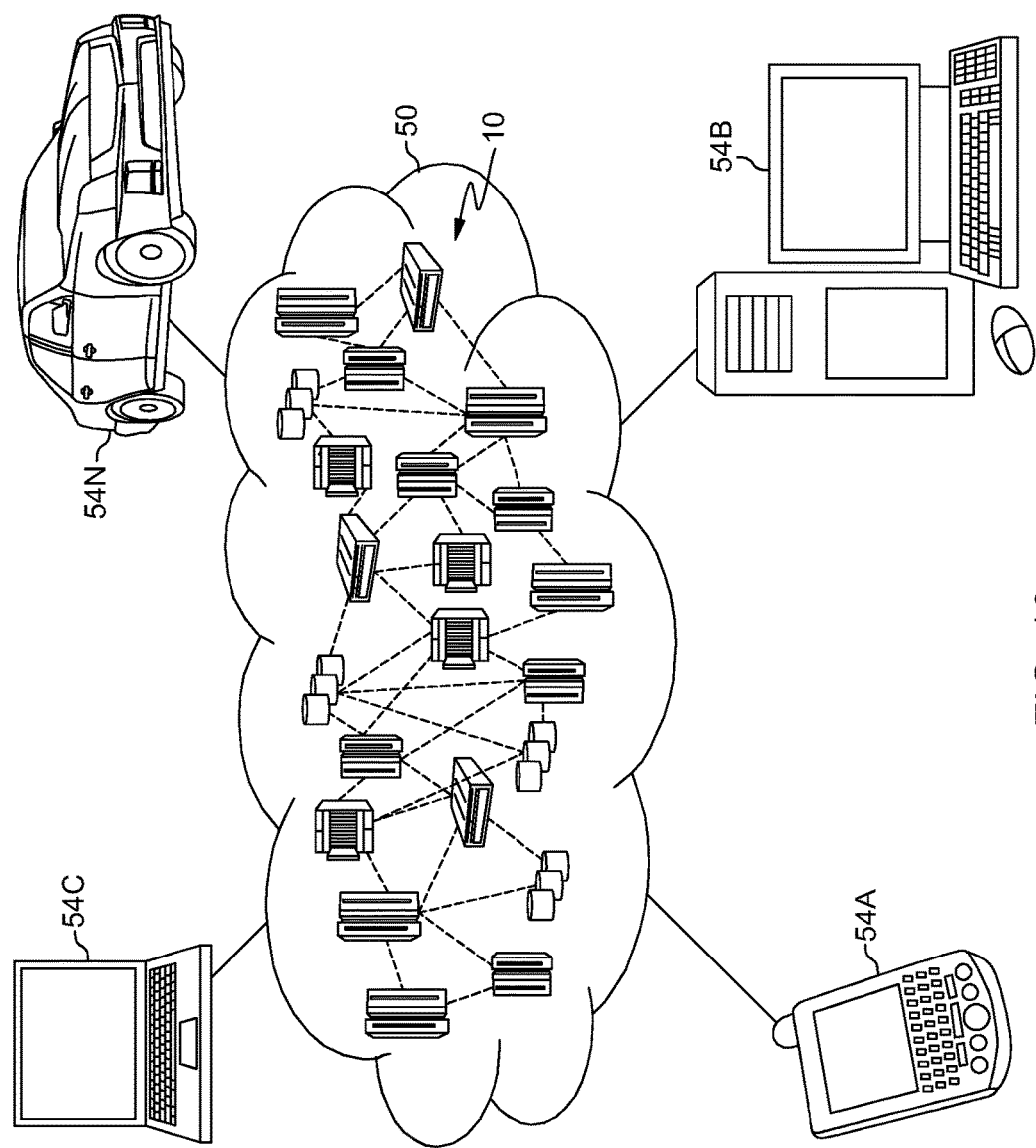
FIG. 10 depicts one embodiment of a cloud computing environment.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
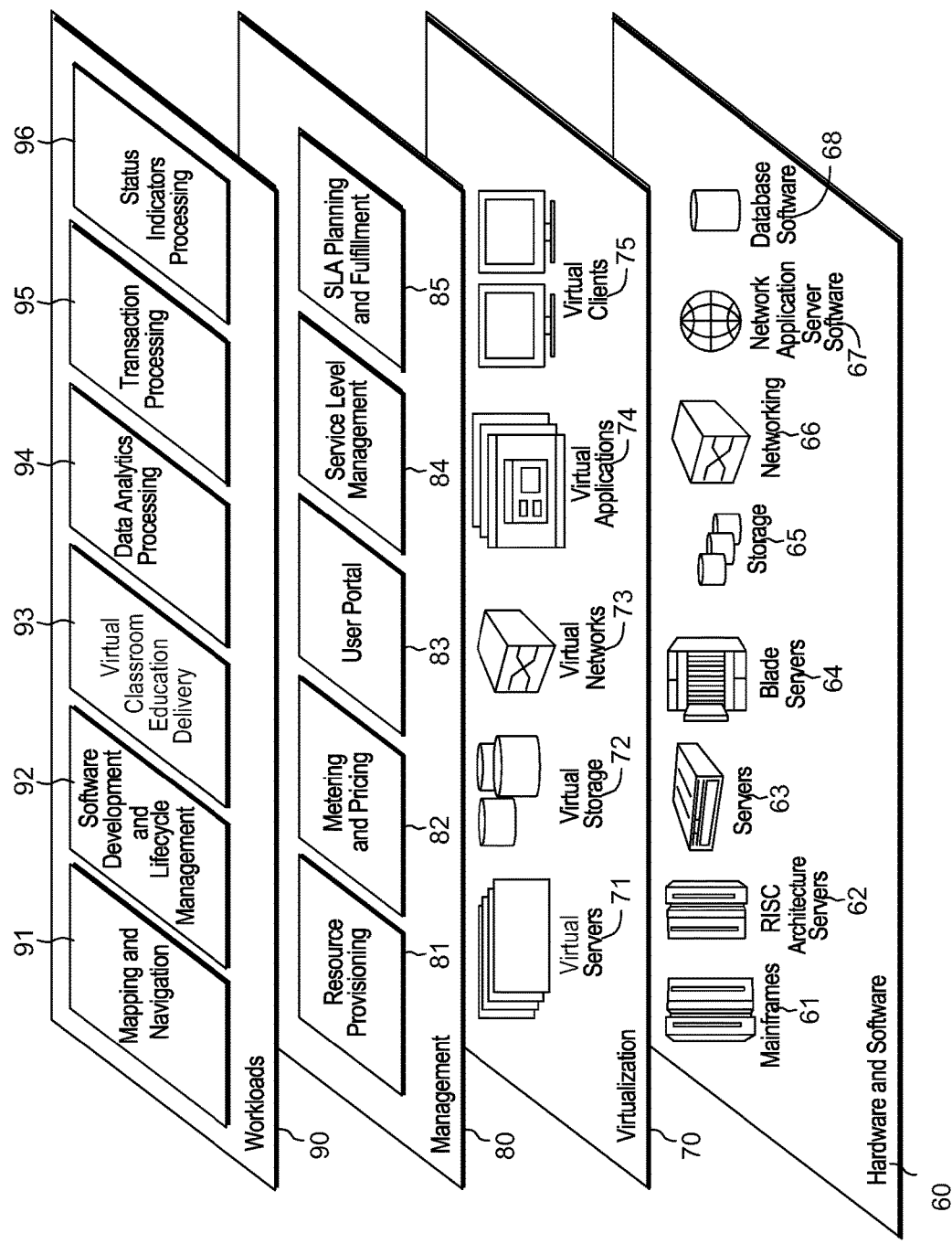
FIG. 11 depicts one example of abstraction model layers.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and status indicator processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Additionally, other operating modes in addition to or in lieu of one or more of the operating modes described herein may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of providing status indicators, said computer-implemented method comprising:
   performing, by a processor, an operation in a current operating mode of the processor, the current operating mode being dynamically selectable from a plurality of supported operating modes;
   setting a first set of status indicators, based on performing the operation in the current operating mode, the first set of status indicators to include at least one status indicator;
   setting a second set of status indicators, based on performing the operation in the current operating mode, the second set of status indicators to include at least one status indicator corresponding to the at least one status indicator of the first set of status indicators and set to correctly reflect at least one status condition for another operating mode supported by the processor, the other operating mode being different from the current operating mode in that the other operating mode and the current operating mode operate on data of different widths; and
   using the first set of status indicators or the second set of status indicators in further processing, the further processing including performing an action within the processor based on at least one indicator of the first set of status indicators or the second set of status indicators being used in the further processing.

2. The computer-implemented method of claim 1, wherein the first set of status indicators comprises a first overflow status indicator and a first carry status indicator, the second set of status indicators includes a second overflow status indicator and a second carry status indicator, and wherein the first overflow status indicator, the first carry status indicator, the second overflow status indicator and the second carry status indicator are included in separate locations within a selected register.

3. The computer-implemented method of claim 1, wherein the other operating mode comprises operating on data in a first width, and the current operating mode comprises operating on data in a second width, wherein the first width comprises 32-bits and the second width comprises 64-bits.

4. The computer-implemented method of claim 1, wherein the at least one status indicator of the first set of status indicators comprises an overflow status indicator or a carry status indicator.

5. The computer-implemented method of claim 1, wherein the setting the first set of status indicators and the setting the second set of status indicators is based on executing a single instruction to perform the operation.

6. The computer-implemented method of claim 1, wherein the using comprises:
   executing an instruction to obtain the first set of status indicators or the second set of status indicators; and
   performing the action based on obtaining the first set of status indicators or the second set of status indicators, the action comprising performing a branch based on the at least one indicator.

7. The computer-implemented method of claim 6, wherein the executing the instruction includes:
   reading content of a first register; and
   placing the content in a second register, the second register to be accessed to perform the action.

8. The computer-implemented method of claim 1, wherein the setting the second set of status indicators is absent performance of the operation in the other operating mode.

9. The computer-implemented method of claim 1, wherein the performing the operation comprises:
   determining first status results for one or more status conditions based on a first data width; and
   determining second status results for the one or more status conditions based on a second data width, wherein at least one of the first status results and the second status results is to be used in setting one or more of the first set of status indicators or the second set of status indicators.

10. The computer-implemented method of claim 9, wherein the setting the first set of status indicators comprises using one of the first status results and the second status results, and the setting the second set of status indicators comprises using the other of the first status results and the second status results.

11. A computer program product for providing status indicators, said computer program product comprising:
a computer non-transitory readable storage medium readable by a processing circuit and storing instructions for performing a method comprising:
performing, by a processor, an operation in a current operating mode of the processor, the current operating mode being dynamically selectable from a plurality of supported operating modes;
setting a first set of status indicators, based on performing the operation in the current operating mode, the first set of status indicators to include at least one status indicator;
setting a second set of status indicators, based on performing the operation in the current operating mode, the second set of status indicators to include at least one status indicator corresponding to the at least one status indicator of the first set of status indicators and set to correctly reflect at least one status condition for another operating mode supported by the processor, the other operating mode being different from the current operating mode in that the other operating mode and the current operating mode operate on data of different widths; and
using the first set of status indicators or the second set of status indicators in further processing, the further processing including performing an action within the processor based on at least one indicator of the first set of status indicators or the second set of status indicators being used in the further processing.

12. The computer program product of claim 11, wherein the first set of status indicators comprises a first overflow status indicator and a first carry status indicator, the second set of status indicators includes a second overflow status indicator and a second carry status indicator, and wherein the first overflow status indicator, the first carry status indicator, the second overflow status indicator and the second carry status indicator are included in separate locations within a selected register.

13. The computer program product of claim 11, wherein the setting the first set of status indicators and the setting the second set of status indicators is based on executing a single instruction to perform the operation.

14. The computer program product of claim 11, wherein the setting the second set of status indicators is absent performance of the operation in the other operating mode.

15. The computer program product of claim 11, wherein the performing the operation comprises:
determining first status results for one or more status conditions based on a first data width; and
determining second status results for the one or more status conditions based on a second data width, wherein at least one of the first status results and the second status results is to be used in setting one or more of the first set of status indicators or the second set of status indicators.

16. A computer system for providing status indicators, said computer system comprising:
a memory; and
a processor in communication with the memory, wherein the computer system is configured to perform a method, said method comprising:
performing, by the processor, an operation in a current operating mode of the processor, the current operating mode being dynamically selectable from a plurality of supported operating modes;
setting a first set of status indicators, based on performing the operation in the current operating mode, the first set of status indicators to include at least one status indicator;
setting a second set of status indicators, based on performing the operation in the current operating mode, the second set of status indicators to include at least one status indicator corresponding to the at least one status indicator of the first set of status indicators and set to correctly reflect at least one status condition for another operating mode supported by the processor, the other operating mode being different from the current operating mode in that the other operating mode and the current operating mode operate on data of different widths; and
using the first set of status indicators or the second set of status indicators in further processing, the further processing including performing an action within the processor based on at least one indicator of the first set of status indicators or the second set of status indicators being used in the further processing.

17. The computer system of claim 16, wherein the first set of status indicators comprises a first overflow status indicator and a first carry status indicator, the second set of status indicators includes a second overflow status indicator and a second carry status indicator, and wherein the first overflow status indicator, the first carry status indicator, the second overflow status indicator and the second carry status indicator are included in separate locations within a selected register.

18. The computer system of claim 16, wherein the setting the first set of status indicators and the setting the second set of status indicators is based on executing a single instruction to perform the operation.

19. The computer system of claim 16, wherein the setting the second set of status indicators is absent performance of the operation in the other operating mode.

20. The computer system of claim 16, wherein the performing the operation comprises:
determining first status results for one or more status conditions based on a first data width; and
determining second status results for the one or more status conditions based on a second data width, wherein at least one of the first status results and the second status results is to be used in setting one or more of the first set of status indicators or the second set of status indicators.

* * * * *